United States Patent [19]

Kuzarov

[11] 3,986,588

[45] Oct. 19, 1976

[54] BRAKE-CLUTCH ASSEMBLY FOR A WINCH

[75] Inventor: Encho Janaki Kuzarov, Milwaukie, Oreg.

[73] Assignee: Warn Industries, Inc., Kent, Wash.

[22] Filed: Sept. 23, 1975

[21] Appl. No.: 615,937

[52] U.S. Cl. .............................. 192/16; 192/107 R; 188/218 XL; 188/71.2
[51] Int. Cl.² .................... F16D 65/12; F16D 67/00
[58] Field of Search .................. 192/15, 16, 107 R; 188/218 XL, 73.2

[56] References Cited
UNITED STATES PATENTS

| 1,919,754 | 7/1933 | Sejerson | 192/15 X |
| 2,581,637 | 1/1952 | Danley et al. | 192/107 R X |
| 3,352,384 | 11/1967 | Stevens | 192/15 X |

FOREIGN PATENTS OR APPLICATIONS

| 531,140 | 4/1955 | Italy | 192/107 R |

Primary Examiner—Benjamin W. Wyche
Attorney, Agent, or Firm—Graybeal, Barnard & Uhlir

[57] ABSTRACT

An automobile mounted winch having a clutch-brake assembly comprising a disc shaped ratchet plate positioned between two friction shoes, acting as a clutch in one direction and a speed governor in another direction, and a stationary brake. A plurality of friction buttons extend through the ratchet plate in a generally circular pattern, with each button engaging both shoes. Each button has an expanded head portion, and the buttons are oppositely arranged in an alternating pattern to centrally locate the ratchet between the two shoes and provide proper frictional engagement of the buttons with the shoes.

16 Claims, 6 Drawing Figures

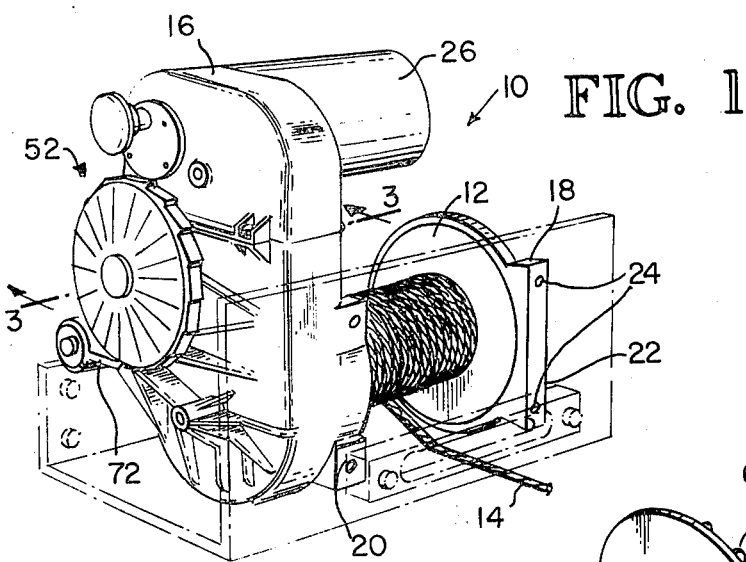
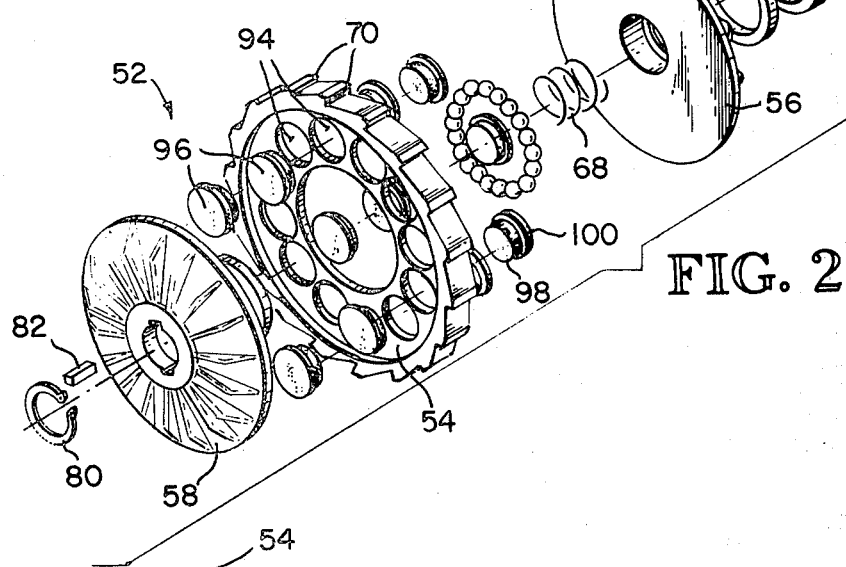
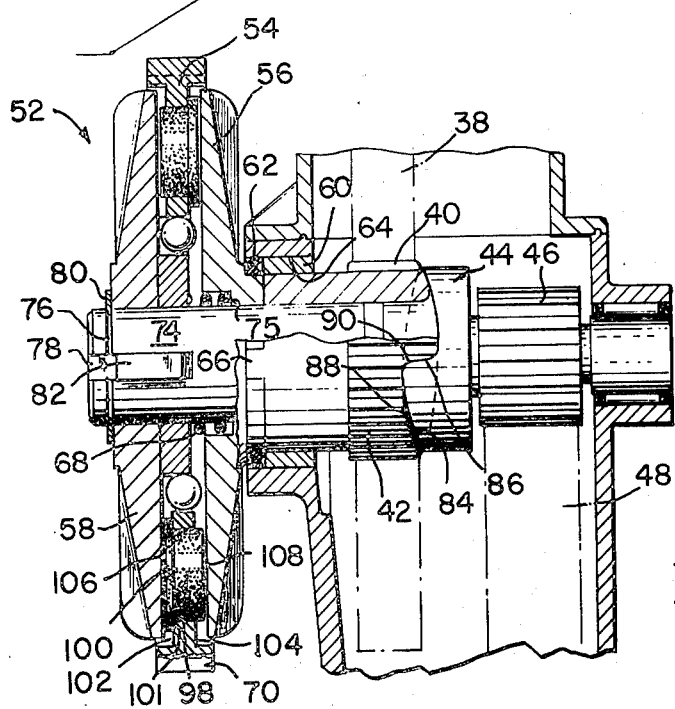

BRAKE-CLUTCH ASSEMBLY FOR A WINCH

BACKGROUND OF THE INVENTION

1. Field of the Invention

The present invention relates to a brake-clutch assembly for use in a torque transmitting apparatus such as a winch.

2. Description of the Prior Art

There is in the prior art a winch manufactured by Warn Industries, Inc. of Kent, Washington, the assignee of the present invention, which comprises a motor that transmits power through a speed reducing gear transmission to a first drive cam having an axially facing cam surface. This drive cam engages an axially facing cam face of a second driven cam which through a further speed reducing gear transmission drives the cable winding drum of the winch. A clutch-brake assembly is operatively connected between the two cams, this assembly comprising a first shoe connected to the first cam to rotate therewith, a second shoe connected to the second cam to rotate therewith, and a ratchet plate positioned between the two shoes. There is a pawl which engages the ratchet plate to permit the ratchet plate to rotate only in the direction which the brake-clutch assembly moves to reel in cable.

When the winch is operated under power in a first direction to reel in cable, the drive cam engages the driven cam in wedging engagement to tend to move the two cams axially away from each other and to push the two shoes into engagement with the ratchet plate. This effectively locks up the two cams and the clutch-brake assembly as a single rotating unit through which power is transmitted to the drum to reel in cable.

When the winch is operated in the opposite direction, e.g. in lowering a load, the drive cam moves in a direction out of wedging engagement with the second cam, so that it does not push the shoes of the assembly into engagement with the ratchet plate. However, a circumferentially facing shoulder of the drive cam engages a matching shoulder of the driven cam so that the driven cam is positively engaged to be moved in a direction to unwind cable. If the cable is under tension loading, as in the instance of lowering a suspended mass, the tension load on the cable tends to cause the second driven cam to overrun the first drive cam to push the drive cam back into wedging engagement. Since the pawl engaging the ratchet plate does not permit rotation of the ratchet plate in a direction to unwind cable, as the two shoes come into frictional engagement with the ratchet plate, the ratchet plate tends to stop the rotation of the two shoes until the motor turns the drive cam sufficiently to cause it to "catch up". In effect, the brake-clutch assembly acts as a governor or "dynamic brake" to limit the rotational speed of the components to that which the motor imparts to them. In actual operation this condition stabilizes so that the drum rotates only at the speed permitted by the rotational speed of the motor, with the major torque loads exerted back through the winch components being absorbed in the sliding frictional engagement of the shoes with the ratchet plate.

In the prior art winch described above, the frictional engagement between the ratchet plate and the two shoes was provided by fixedly mounting to each face of the ratchet plate a number of arcuate sections of durable material (e.g. an asbestos based material), which is conventionally used for the facing material in brakes and clutches. However, this arrangement which is usually satisfactory in conventional brake or clutch assemblies did not prove entirely satisfactory in this particular application, where in the cable unwinding mode, the two shoes were in constant sliding frictional engagement with the ratchet plate, with the major portion of the energy input into the winch (for example, the energy resulting from lowering a load at a constant rate) being absorbed at the frictionally engaging surfaces of the two shoes and the ratchet plate. There was excessive wear, premature wearing out of the frictional engaging components, elevated temperatures, and worn firction material acting as a lubricant between the shoes and the ratchet plate. This was due to irregularities or misalignment of the frictionally engaging parts.

Within the broader field of brakes and clutches for various applications, there is in the prior art a variety of arrangements to provide frictional engagement between rotating parts. For example, in U.S. Pat. No. 1,734,598, Schramm, there is a driving member having a face which engages a plurality of cylindrical plugs which are loosely mounted in the peripheral portion of a plate. These plugs provide frictional engagement between the driving member and the plate so that power can be transmitted therebetween. A similar arrangement is shown in U.S. Pat. No. 2,082,696, Myers, where there are a number of cylindrical members, called "friction blocks" loosely positioned within a driven member.

U.S. Pat. No. 1,132,958 shows a plurality of projections on friction discs. In two other patents, U.S. Pat. No. 3,034,365, Stieber, and U.S. Pat. No. 3,224,540, Straub, there are a number of rollers freely mounted in disc plates to provide frictional engagement between members.

While the prior art does provide a number of brake mechanisms and clutch mechanisms which do provide frictional engagement between members in various arrangements, there is still a need for a clutch-brake assembly which can operate effectively in an apparatus such as the winch described above, particularly in its operating mode of a dynamic brake where it acts as a governor, and not experience excessive wear. Thus, it is an object of the present invention to provide a clutch-brake assembly to fulfil this need.

SUMMARY OF THE INVENTION

The present invention is an improvement in a clutch-brake assembly adapted for use in combination with a torque-power transmitting apparatus, such as a winch. The particular type of apparatus for which the improvement of the present invention is especially adapted comprises:

a. a rotatable power output means, such as a cable winding drum, b. a power transmitting means, such as a speed reducing gear transmission of a winch, to rotate in a first direction to transmit power to said power output means, and rotatable in a second direction in a manner to be able to transmit power from said power output means in a reverse second direction, c. a clutch-brake assembly operatively connected to the torque power transmitting means and comprising:

1. a rotatably mounted ratchet plate, 2. means such as a pawl to permit the ratchet plate to rotate in a first direction to transmit power to the power output means, and to prevent rotation of the ratchet plate in the reverse direction, and 3. a pair of rotatably mounted shoes positioned on opposite sides of the ratchet plate and engageable therewith so as to rotate with the ratchet plate in a first direction in a power transmitting mode, and to rotate in an opposite direction in sliding frictional engagement with the ratchet plate to absorb energy when power is transmitted from the power output means in the second direction.

The particular improvement for the clutch-brake means described above comprises first providing the ratchet plate with a plurality of through holes aligned with the axis of rotation of the ratchet plate and spaced radially therefrom in a generally circumferential pattern. There is provided a plurality of friction buttons positioned one in each in said holes. Each friction button comprises a cylindrical shank portion positioned in its related hole and extending in a first direction beyond one face of the ratchet plate to engage a friction face of one of the shoes, and an expanded head portion positioned adjacent its related hole to extend in a second opposite direction therefrom to engage a friction face of the other of the shoes. The head portion has a generally circumferential shoulder to engage a second face of said ratchet plate and position the ratchet plate with respect to the shoes it is engaging, and also properly locate itself relative to the shoes and the ratchet plate. In the preferred configuration, the friction buttons are arranged oppositely in a generally alternating pattern wherein the head portions of one set of friction buttons is positioned on one side of the ratchet plate to locate the one shoe and ratchet plate relative to each other, and the head portions of the second set of friction buttons are located on the other side of the ratchet plate so as to properly locate the ratchet plate and the second shoe relative to each other.

If the preferred form, each of the buttons is positioned in the ratchet plate so that it can rotate freely therein and desirably has a sufficiently loose interfit with its related hole so that moderate axial shifing is possible to compensate for surface irregularities or misalignment of the component parts. The preferred form of mounting the ratchet plate relative to the shoes for proper axial alignment is to provide between the two shoes a centrally located cylindrical hub, around which are roller bearings (desirably ball bearings) which in turn engage an interior cylindrical surface of the ratchet plate.

BRIEF DESCRIPTION OF THE DRAWINGS

FIG. 1 is a perspective view of a winch for which the improvement of the present invention is particularly adapted;

FIG. 2 is an exploded perspective view of the clutch-brake assembly of the present invention;

FIG. 3 is a longitudinal sectional view of the clutch-brake assembly of the present invention, and of certain of the power transmitting components of the winch;

FIG. 5 is a schematic view illustrating one operating mode of the winch, wherein power is being transmitted to the drum so as to reel cable in.

DESCRIPTION OF THE PREFERRED EMBODIMENT

Figure 4:
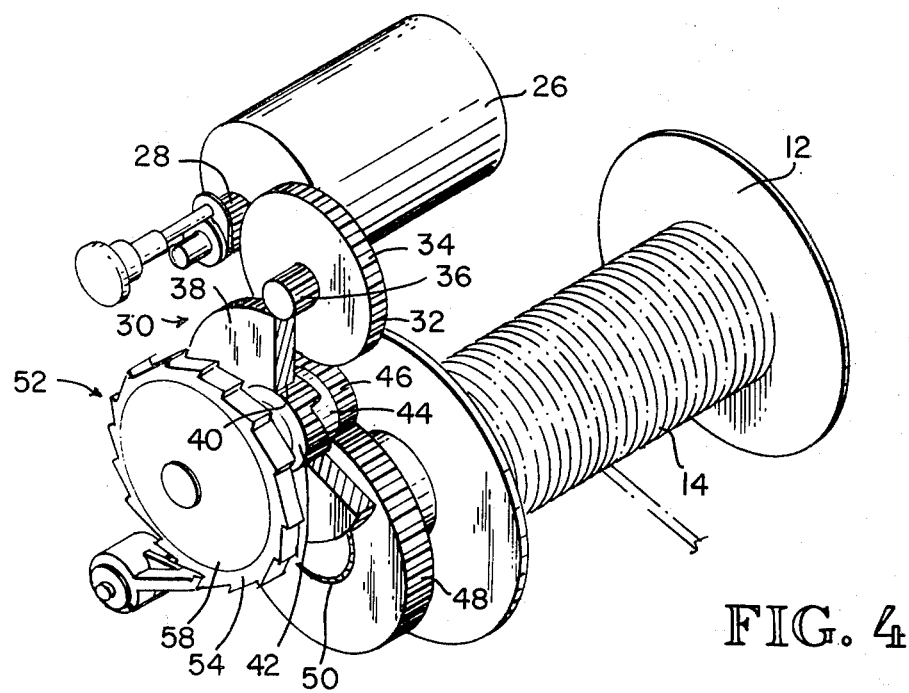
FIG. 4 is an isometric view of the winch of FIG. 1, with the housing of the winch removed to show the power transmitting components of the winch.

As indicated previously herein, under the subject "Summary of the Invention", the present invention is an improvement in the clutch-brake assembly of an existing prior art winch. It is believed that a clearer understanding of the present invention will be attained by first describing the main operating components of the above-mentioned prior art winch and its mode of operation. After this, the improvement of the present invention will be described in detail.

In the accompanying drawing, there is shown a winch 10, comprising a drum 12 having a cable 14 wound thereon, and two end housings, namely a main housing 16 containing the drive components of the winch 10, and an opposite end housing 18. The winch 10, as shown herein, is particularly adapted to be mounted to the front bumper bracket of an automotive vehicle, and thus the two housings 16 and 18 each have a forwardly facing contact surface 20 and 22, respectively, and openings 24 by which the two housings 16 and 18 can be bolted to an automobile bumper.

There is an electric motor 26 which is mounted to the upper portion of the main drive housing 16 and which through a pinion gear 28 supplies power to a speed reducing gear transmission 30, which in turn powers the drum 10 to either reel in or pay out the cable 14. The power transmission 30 comprises a first cluster gear assembly 32 made up of a larger first stage gear 34 and a second pinion gear 36 rigidly attached to the gear 34. The pinion gear 36 engages a larger second stage gear 38 mounted by a spline connection 40 to a first drive cam member 42.

There is a second drive cam member 44, axially aligned with the first cam member 42 and positioned just to the right thereof (as viewed from a position forwardly of the winch as shown in FIGS. 1 and 4). This second driven cam member has a third pinion gear 46 formed integrally therewith, and this third pinion gear 46 meshes with a main drive gear 48 connected by a spline connection 50 to the drum 12.

Mounted to the left of the two cam members 42 and 44 and in axial alignment therewith is a brake-clutch assembly 52, made up of a center ratchet plate 54 and right and left disc-shaped shoes 56 and 58, respectively, positioned on opposite sides of the ratchet plate 54. The particular arrangement of the brake-clutch assembly 52 is especially significant in the present invention, and it is believed that a clearer understanding of the advantages of this particular clutch-brake assembly 52 will be achieved by first describing the main components and the operation thereof, and then describing the specific improvements which comprise the present invention.

The right shoe 56 is a drive shoe and is mounted so as to rotate with the first drive cam 42. More particularly, the left hand portion of the cam member 42 (that portion to the left of the spline 40) is cylindrical and fits within a radial bearing member 60 and a seal member 62, within a cylindrical opening 64 in the main housing 16. Protruding axially from the left end of the cam member 42 is a drive lug 66 which extends into an arcuate matching slot in the shoe 56 so that the cam member 42 and shoe 56 rotate together. A compression spring 68 is positioned between the shoes 56 and 58 to urge them apart.

The ratchet plate 54 has its outer circumference formed with a plurality of ratchet teeth 70 which are constantly engaged by a pawl 72. The left shoe 58 is the driven shoe and is fixedly mounted to the left end of an inner shaft member 74 which is integral with the second driven cam member 44. This inner shaft member 74 extends through a series of aligned through openings 75 formed in the drive cam member 42, the ratchet plate 54 and the two shoes 56 and 58. The left end of the shaft member 74 is formed with a circumferential groove 76 and a pair of axial slots 78 to receive, respectively, a retaining snap ring 80 and two key members 82, which members 80 and 82 fixedly secure the left driven shoe 58 to the shaft member 74 that is integral with the second driven cam member 44.

The right axially facing surface of the first drive cam member 42 has two slanting cam surfaces 84 which are at an angle of about fifteen degrees to twenty degrees with a plane perpendicular to the axis of rotation of the cam member 42. Also, the first cam member 42 has a pair of shoulders 86, the surfaces of which are parallel to the axis of rotation of the cam member 42. The driven cam member 44 has a pair of matching cam surfaces 88 to engage the cam surfaces 84 in wedging engagement, and a pair of shoulders 90 to engage the shoulders 86 in positive engagement.

At this point let us now review the main functional components thus far described. With respect to the operation of the winch 10, these can be grouped as follows:

a. The motor 26, which supplies power for the winch.
b. A first power transmitting means, which is made up of the first stage gear cluster 32 (comprising a first main gear 34 and pinion gear 36) and a second stage gear 38 having the spline connection 40, the primary function of this first power transmitting means being to transmit power from the motor 26 to the first drive cam 42.
c. The first drive cam 42.
d. The second drive cam 44.
e. A second power transmitting means, which is made up of the third pinion 46 and main drive gear 48, the function of these components being to transmit power from the second driven cam member 44 to the drum 12.
f. The drum 12.
g. The clutch-brake assembly 52, the essential function of the clutch-brake assembly 52 being to provide between the two cam members 42 and 44 a multi-purpose operative connection, the nature of which will be described more fully hereinafter. This clutch-brake assembly is made up of three main subcomponents, namely:
 1. The ratchet plate 54;
 2. The power input shoe 56 that is mounted to rotate with the first drive cam 42, and
 3. The power output shoe 58 which is fixedly mounted to the second driven cam member 44.

Figure 5:
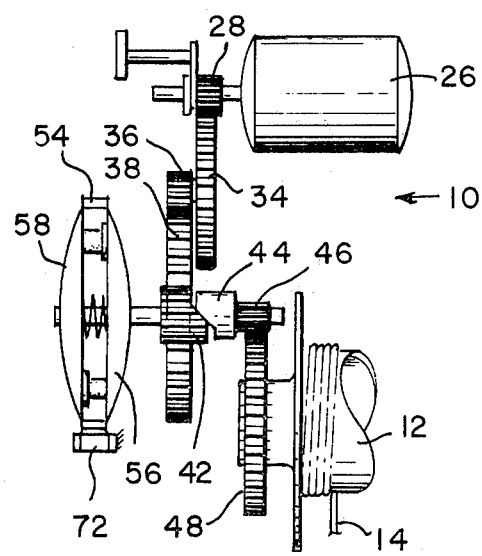
Figure 6:
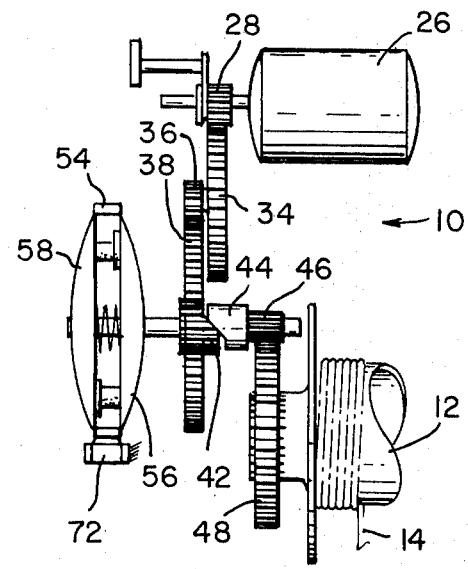
FIG. 6 is a schematic view similar to FIG. 5, but showing the winch in a second operating mode wherein power is being transmitted from the winch back into the component parts of the winch, as in the case of the cable being reeled out under tension.

These main functional components listed immediately above in paragraphs (a) through (g) exist in the prior art, although not in the precise physical configuration as shown herein. Reference is now made to FIGS. 5 and 6 which show two operating modes of the winch 10.

In FIG. 5, the winch 10 is shown operating under power to reel in cable 14. Power from the motor 26 is transmitted through the first power transmitting gears 32–38 to cause the first drive cam 42 to rotate in a direction (upwardly as seen in FIG. 5) to be forced into wedging engagement with the second driven cam 44. This causes the drive cam 42 to be moved to the left as seen in FIG. 5, so that the shoe 56 engages the ratchet plate 54 and in turn presses it against the shoe 58. This essentially locks the clutch-brake assembly in place so that the two cams 42 and 44 and the clutch-brake assembly 52 all rotate as a single power transmitting unit. Thus, the second drive cam 44 acts through the second part of the power transmission 30 to cause the drum 12 to rotate in a direction to reel in the cable 14.

In FIG. 6, the winch 10 is shown in its operating condition to pay out cable under tension, as in the situation where the winch 10 is lowering a load. In terms of physical position, all the components appear to be in the same location as shown in FIG. 5. However, the pawl 72, prevents the ratchet plate 54 from rotating in the opposite direction to pay out the cable 14, so there must be relative rotation between the shoes 56 and 58 and ratchet plate 54. The motor 26 transmits power to the first cam 42 to tend to rotate the cam 42 out of wedging engagement with the cam member 44. However, since there is a tension load on the cable 14, back torque is transmitted through the drum 12 through the gears 46 and 48 to tend to cause the second cam member 44 to overrun the first cam member 42 and force it back into wedging engagement.

This presses the right shoe 56 into frictional engagement with the ratchet plate 54 which in turn presses against the shoe 58, to retard rotational movement of the shoe 56 and the cam 44. However, as the drive cam 42 continues to be rotated by the motor 26, it tends to move the two cams 42 and 44 back out of wedging engagement. In actual operation, this condition stabilizes so that the drum 12 rotates only at the speed permitted by the rotational speed of the motor 26, with the major torque loads exerted back through the winch components being absorbed in the frictional engagement of the shoes 56 and 58 with the ratchet plate 54. Thus, if the winch 10 is operating in this mode for an extended length of time, with the cable 14 under substantial tension loading, as in lowering a heavy load over a long distance, there is a substantial energy input into the winch 10, which must be absorbed in the frictional engagement of the shoes 56 and 58 with the ratchet plate 54.

In the prior art winch described herein, the ratchet plate 54 was provided with sections of a suitable material, such as an asbestos based material, commonly used in brakes and clutches as the frictionally engaging material, bonded or otherwise fixedly mounted to the two faces of the ratchet plate. However, under the severe operating conditions, such as described above in the second mode of operation of the winch, the friction material would experience excessive heat and wear. It is believed that the wear on the friction material in the prior art winch is due essentially to the development of excessive heat on those portions of the friction material which experience higher unit loading because of misalignment and/or irregularities in the shoes 56 and 58 and the ratchet plate 54.

The improvement on the present invention was created specifically to provide proper frictional engagement between the shoes 56 and 58 with the ratchet plate 54, without excessive wear in the frictionally engaging material. To describe the improvement of the present invention, the ratchet plate 54 is provided with a plurality of axially aligned through holes 94 arranged in a generally circular or circumferential pattern about the center axis of rotation of the ratchet plate 54. Positioned in each hole 94 is one of a plurality of friction buttons 96, made of a suitable friction material, such as natural or synthetic fibers mixed with metal and bonding agents. Each button 96 comprises a cylindrical shank portion 98 and an expanded head portion 100 formed integrally with the shank 98. There is a moderately loose interfit of each button with its related hole 94, so that each button is able to rotate in its hole 94 and shift axially therein.

Each button 96 has its head portion 100 positioned on one side of the ratchet plate 54, with the shank portion 98 extending through its related hole 94 and extending a short distance beyond. The buttons 96 are oppositely arranged in an alternating pattern, with the head portions 100 of adjacent buttons 96 being positioned on opposite sides of the ratchet plate 54. The head 100 of each button 96 has an annular shoulder 101 which bears against one of the two side faces 102 or 104 of the ratchet plate 54, with the thickness dimension of the heads 100 of the several buttons 96 providing a predetermined spacing between the ratchet plate 54 and the two shoes 56 and 58. The length of the shank 98 of each button 96 is such that the shank 98 extends beyond the opposite surface of the ratchet plate 54. Thus, each button 96 presents two friction surfaces to the shoes 56 and 58, namely: (a) a moderately larger frictional surface which is the outwardly facing surface of the head 106, and (b) a moderately smaller frictional face 108 which is the axial surface of the exposed end of the shank 98. Each shank 98 fits within its related hole 94 with a sufficiently loose tolerance so that the button 96 is able to rotate within the hole 94 and shift very moderately axially within the hole 94.

In operation, the winch 10 functions substantially as described above, with the two shoes 56 and 58 coming into sliding frictional engagement with the ratchet plate 54. It has been found that the particular arrangement of the friction buttons 96 in the ratchet plate 54 provides a substantially longer lasting clutch-brake assembly. While the precise reasons for this are difficult to determine with complete accuracy, the following can be proposed with reasonable justification.

First, the provision of the expanded head 100 for the buttons 96 provides uniform spacing between the ratchet plate 54 and the two shoes 56 and 58. Thus, with respect to the axial dimensions of the buttons 96, the friction buttons 96 remain properly centered in the ratchet plate 54 so that they are not subjected to substantially unequal lateral forces which would tend to push the buttons 96 out of proper axial alignment.

Secondly, it is believed that with the moderately loose mounting of the buttons 96, each button 96 tends to rotate it about its center axis. The effect of such rotation of the individual buttons 96 in their holes has a cleaning effect on the friction surfaces to prevent buildup of any grease or other cotamination (by ejecting such contamination radially outwardly), which would otherwise impair the proper frictional engagement. This ensures balanced frictional engagement around the clutch assembly.

However, regardless of the accuracy or correctness of the hypothesis advanced above, it has been found that this particular arrangement of this clutch-brake assembly has proven to be very effective in the operation of the winch such as described above.

What is claimed is:
1. In a torque transmitting apparatus, such as a winch, wherein there is:
 a. a rotatable power output means, such as a drum having a cable wound thereon,
 b. a power transmitting means, such as a speed reducing gear transmission, to rotate in a first direction to transmit power to said power output means, and rotatable in a second direction in a manner to be able to transmit power from said power output means in a second reverse direction,
 c. a clutch-brake assembly operatively connected to said power transmitting means and comprising:
  1. a rotatably mounted ratchet plate,
  2. pawl means to permit said ratchet plate to rotate in a first direction to transmit power to said output means and to prevent rotation of said ratchet plate in the reverse direction, and
  3. a pair of rotatably mounted shoes positioned on opposite sides of the ratchet plate and engageable therewith so as to rotate with said ratchet plate in a first direction in a power transmitting mode, and to rotate in an opposite direction in sliding frictional engagement with the ratchet plate to absorb energy when power is transmitted from the power output means in said second direction, an improvement for said brake-clutch assembly, said improvement comprising:
 a. said ratchet plate having a plurality of through holes aligned with an axis of rotation of said ratchet plate and spaced radially therefrom in a generally circumferential pattern, and
 b. a plurality of friction buttons positioned one in each of said holes, each of said friction buttons comprising:
  1. a cylindrical shank portion positioned in its related hole and extending in a first direction beyond one face of the ratchet plate to engage one of said shoes,
  2. an expanded head portion positioned adjacent its related hole to extend in a second opposite direction therefrom to engage the other of the shoes, said head portion having a generally circumferential shoulder to engage a second face of said ratchet plate and position the ratchet plate with respect to the shoe it is engaging and properly locate itself relative to the shoe, and the ratchet plate.

2. The improvement as recited in claim 1, wherein said friction buttons are positioned in said ratchet plate oppositely in an alternating pattern, whereby the head portions of one set of said friction buttons are positioned on one side of said ratchet plate to locate the ratchet plate relative to one of said shoes, and the head portions of a second set of said friction buttons are located on the other side of said ratchet plate to locate the ratchet plate relative to the other side of the shoes.

3. The improvement as recited in claim 2, wherein each of said friction buttons is mounted for free rotation in its related hole, whereby the button is free to rotate to maintain a clean frictionally engaging surface.

4. The improvement as recited in claim 3, wherein each of said friction buttons is mounted in its related hole with a sufficiently loose tolerance to permit moderate axial shifting of the buttons, to compensate for surface irregularities in frictionally engaging surfaces thereof.

5. The improvement as recited in claim 1, wherein each of said friction buttons is mounted for free rotation in its related hole, whereby the button is free to rotate to maintain a clean frictionally engaging surface.

6. The improvement as recited in claim 5, wherein each of said friction buttons is mounted in its related hole with a sufficiently loose tolerance to permit moderate axial shifting of the buttons, to compensate for surface irregularities in frictionally engaging surfaces thereof.

7. The improvement as recited in claim 1, wherein there is a centrally located internal hub having an outer cylindrical surface, and further comprising roller bearings mounted around said hub and engaging an inner cylindrical surface of said ratchet plate.

8. The improvement as recited in claim 7, wherein said roller bearings comprise ball bearings.

9. A clutch-brake assembly for a torque transmitting apparatus, such as a winch, wherein there is a rotatable power output means, such as a drum having a cable wound thereon, and a power transmitting means, such as a speed reducing gear transmission, to rotate in a first direction to transmit power to said power output means, and rotatable in a second direction in a manner to be able to transmit power from said power output means in a second reverse direction, said clutch-brake assembly comprising:
 a. a rotatably mounted ratchet plate,
 b. pawl means to permit said ratchet plate to rotate in a first direction to transmit power and to prevent rotation of said ratchet plate in the reverse direction,
 c. a pair of rotatably mounted shoes positioned on opposite sides of the ratchet plate and engageable therewith so as to rotate with said ratchet plate in a first direction in a power transmitting mode, and to rotate in an opposite direction in sliding frictional engagement with the ratchet plate to absorb energy,
 d. said ratchet plate having a plurality of through holes aligned with an axis of rotation of said ratchet plate and spaced radially therefrom in a generally circumferential pattern, and
 e. a plurality of friction buttons positioned one in each of said holes, each of said friction buttons comprising:
  1. a cylindrical shank portion positioned in its related hole and extending in a first direction beyond one face of the ratchet plate to engage one of said shoes,
  2. an expanded head portion positioned adjacent its related hole to extend in a second opposite direction therefrom to engage the other of the shoes, said head portion having a generally circumferential shoulder to engage a second face of said ratchet plate and position the ratchet plate with respect to the shoe it is engaging and properly locate itself relative to the shoe, and the ratchet plate.

10. The improvement as recited in claim 9, wherein said friction buttons are positioned in said ratchet plate oppositely in an alternating pattern, whereby the head portions of one set of said friction buttons are positioned on one side of said ratchet plate to locate the ratchet plate relative to one of said shoes, and the head portions of a second set of said friction buttons are located on the other side of said ratchet plate to locate the ratchet plate relative to the other of the shoes.

11. The improvement as recited in claim 10, wherein each of said friction buttons is mounted for free rotation in its related hole, whereby the button is free to rotate to maintain a clean frictionally engaging surface.

12. The improvement as recited in claim 11, wherein each of said friction buttons is mounted in its related hole with a sufficiently loose tolerance to permit moderate axial shifting of the buttons, to compensate for surface irregularities in frictionally engaging surfaces thereof.

13. The improvement as recited in claim 9, wherein each of said friction buttons is mounted for free rotation in its related hole, whereby the button is free to rotate to maintain a clean frictionally engaging surface.

14. The improvement as recited in claim 13, wherein each of said friction buttons is mounted in its related hole with a sufficiently loose tolerance to permit moderate axial shifting of the buttons, to compensate for surface irregularities in frictionally engaging surfaces thereof.

15. The improvement as recited in claim 9, wherein there is a centrally located internal hub having an outer cylindrical surface, and further comprising roller bearings mounted around said hub and engaging an inner cylindrical surface of said ratchet plate.

16. The improvement as recited in claim 15, wherein said roller bearings comprise ball bearings.

* * * * *